US007128652B1

(12) United States Patent
Lavoie et al.

(10) Patent No.: US 7,128,652 B1
(45) Date of Patent: Oct. 31, 2006

(54) SYSTEM, METHOD, AND ARTICLE OF MANUFACTURE FOR GAMING FROM AN OFF-SITE LOCATION

(75) Inventors: James R. Lavoie, Voluntown, CT (US); John A. Santini, Jr., Wakefield, RI (US); Robert C. Angell, West Greenwich, RI (US)

(73) Assignee: Oneida Indian Nation, Vernon, NY (US)

( * ) Notice: Subject to any disclaimer, the term of this patent is extended or adjusted under 35 U.S.C. 154(b) by 0 days.

(21) Appl. No.: 09/689,841

(22) Filed: Oct. 13, 2000

(51) Int. Cl.
*A63F 13/00* (2006.01)

(52) U.S. Cl. ........................................................ 463/42

(58) Field of Classification Search .................. 463/16, 463/25, 40, 1, 17, 29, 41, 42
See application file for complete search history.

(56) References Cited

U.S. PATENT DOCUMENTS

| | | | | |
|---|---|---|---|---|
| 4,240,635 | A | 12/1980 | Brown | 194/244 |
| 4,283,709 | A | 8/1981 | Lucero et al. | 235/375 |
| 4,335,809 | A | 6/1982 | Wain | 463/20 |
| 4,339,798 | A | 7/1982 | Hedges et al. | 340/323 R |
| 4,467,424 | A | 8/1984 | Hedges et al. | 340/323 R |
| 4,494,197 | A | 1/1985 | Troy et al. | 273/274 |
| 4,575,622 | A | 3/1986 | Pallegrini | 235/382 |
| 4,636,951 | A | 1/1987 | Harlick | 235/380 |
| 4,648,600 | A | 3/1987 | Olliges | 463/19 |
| 4,669,730 | A | 6/1987 | Small | 463/17 |
| 4,760,527 | A | 7/1988 | Sidley | 463/13 |
| 4,815,741 | A | 3/1989 | Small | 463/17 |
| 4,842,278 | A | 6/1989 | Markowicz | 273/138 |
| 4,856,787 | A | 8/1989 | Itkis | 273/237 |
| 4,880,237 | A | 11/1989 | Kishishita | 273/143 R |
| 4,882,473 | A | 11/1989 | Bergeron et al. | 235/375 |
| 4,926,327 | A | 5/1990 | Sidley | 359/501 |
| 5,038,022 | A | 8/1991 | Lucero | 235/375 |
| 5,069,453 | A * | 12/1991 | Koza et al. | 463/17 |
| 5,119,295 | A | 6/1992 | Kapur | 379/93.13 |
| 5,159,549 | A | 10/1992 | Hallman, Jr. et al. | 463/11 |
| 5,179,517 | A | 1/1993 | Sabin et al. | 463/25 |
| 5,197,094 | A | 3/1993 | Tillery et al. | 379/102 |
| 5,223,698 | A | 6/1993 | Kapur | 235/375 |
| 5,265,874 | A | 11/1993 | Dickinson et al. | 463/25 |

(Continued)

FOREIGN PATENT DOCUMENTS

WO WO 89/06998 8/1989

OTHER PUBLICATIONS

Pot-O-Gold, 19" Touchscreen Multi-Game Terminal Toucheasy Keno Play Description.

(Continued)

*Primary Examiner*—Kim Nguyen
(74) *Attorney, Agent, or Firm*—Finnegan, Henderson, Farabow, Garrett & Dunner, LLP

(57) ABSTRACT

Systems, methods, and articles of manufacture consistent with the present invention allow a patron to play games from an off-site location via an online network. For example, a server may receive, from a first client terminal, a purchase request for at least one wager. The server may determine the results of the at least one wager and store the results of the at least one wager in a database. Then, the server may receive, from a second client terminal, a request to reveal the results of the at least one wager, for example, via an online network, and send the results of the at least one wager to the second client terminal.

14 Claims, 11 Drawing Sheets

U.S. PATENT DOCUMENTS

| | | | | |
|---|---|---|---|---|
| 5,276,312 | A | 1/1994 | McCarthy | 235/380 |
| 5,287,269 | A | 2/1994 | Dorrough et al. | 235/380 |
| 5,297,802 | A | 3/1994 | Pocock et al. | 273/269 |
| 5,324,035 | A | 6/1994 | Morris et al. | 273/139 |
| 5,326,104 | A | 7/1994 | Pease et al. | 273/269 |
| 5,332,076 | A | 7/1994 | Ziegert | 194/217 |
| 5,371,345 | A | 12/1994 | LeStrange et al. | 235/380 |
| 5,408,417 | A | 4/1995 | Wilder | 235/381 |
| 5,429,361 | A | 7/1995 | Raven et al. | 463/25 |
| 5,586,937 | A | 12/1996 | Menashe | 463/41 |
| 5,613,912 | A | 3/1997 | Slater | 235/380 |
| 5,655,961 | A | 8/1997 | Acres et al. | 463/25 |
| 5,674,128 | A * | 10/1997 | Holch et al. | 463/42 |
| 5,722,890 | A | 3/1998 | Libby et al. | 463/16 |
| 5,755,621 | A | 5/1998 | Marks et al. | 273/292 |
| 5,761,647 | A | 6/1998 | Boushy | 705/10 |
| 5,762,552 | A | 6/1998 | Vuong et al. | 396/235 |
| 5,770,533 | A | 6/1998 | Franchi | 463/16 |
| 5,797,794 | A | 8/1998 | Angell | 463/17 |
| 5,800,269 | A | 9/1998 | Holch et al. | 463/18 |
| 5,823,879 | A | 10/1998 | Goldberg et al. | 463/42 |
| 5,830,067 | A | 11/1998 | Graves et al. | 273/269 |
| 5,830,068 | A | 11/1998 | Brenner et al. | 463/42 |
| 5,830,069 | A | 11/1998 | Soltesz et al. | 463/42 |
| 5,836,817 | A | 11/1998 | Acres et al. | 463/16 |
| 5,857,911 | A | 1/1999 | Fioretti et al. | 463/40 |
| 5,871,398 | A * | 2/1999 | Schneier et al. | 463/16 |
| 5,917,725 | A | 6/1999 | Thacher et al. | 340/10.1 |
| 5,949,411 | A | 9/1999 | Doerr et al. | 345/716 |
| 5,984,779 | A | 11/1999 | Bridgeman et al. | 273/138.2 |
| 6,024,640 | A | 2/2000 | Walker et al. | 463/17 |
| 6,048,269 | A * | 4/2000 | Burns et al. | 463/25 |
| 6,089,982 | A | 7/2000 | Holch et al. | 463/16 |
| 6,120,024 | A | 9/2000 | Lind | 273/194 A |
| 6,322,446 | B1 | 11/2001 | Yacenda | |
| 6,347,086 | B1 * | 2/2002 | Strachan | 370/389 |
| 6,358,151 | B1 * | 3/2002 | Enzminger et al. | 463/43 |
| 6,383,078 | B1 * | 5/2002 | Yacenda | 463/40 |
| 6,409,602 | B1 * | 6/2002 | Wiltshire et al. | 463/16 |
| 2001/0003100 | A1 * | 6/2001 | Yacenda | 463/41 |

OTHER PUBLICATIONS

Pot-O-Gold, 19" Touchscreen Multi-Game Terminal Superpick Lotto Play Description.

Pot-O-Gold, 19" Touch screen Multi-Game Terminal Touch 6 Lotto Play Description.

Pot-O-Gold, 19" Touch screen Multi-Game Terminal Touch 6 Lotto Technical Description.

Pot-O-Gold, 19" Touchscreen Multi-Game Terminal Supergold Bingo Play Description.

Casinolink, Mikohn Worldwide.

Casinolink System, Mikohn Worldwide.

QuikTrack, Quick Track Gaming, Inc.

Oasis II, CDS Systems and Services.

The Future of Gaming Today, Casino Data Systems.

Casino Systems Solutions, IGT International Game Technology.

Welcome to Casino Data Systems, Casino Data Systems.

Introducing A World Of Opportunities, Bally Systems.

Software Offerings, Advanced Computer Services.

SafeJack, Mikohn Worldwide.

Standing Stone Gaming Open Gaming Protocol (OGP) Specification, Integrated Performance Decisions, Version 2.1, pp. 1-58, dated Apr. 5, 1999.

Yerak, Becky, At cashless slots: You've got mail, and a jackpot, USA Today, Nov. 13, 2000, p. 2E.

Monteau, Harold, National Gaming Indian Commission.

Washburn, Kevin K., National Gaming Indian Commission.

*AT&T Corp. v. Coeur D'Alene Tribe*, 45 F. Supp. 2d 995 (D. Idaho 1998).

S. 692, 106th Congress, 1st Session.

H.R. 3125, 106th Congress, 2d Session.

Amendment in the Nature of a Substitute H.R. 3125, Offered by Mr. Goodlatte of Virginia.

* cited by examiner

SYSTEM, METHOD, AND ARTICLE OF MANUFACTURE FOR GAMING FROM AN OFF-SITE LOCATION

RELATED APPLICATIONS

This application is related to U.S. patent application Ser. No. 09/488,556, filed Jan. 21, 2000, U.S. patent application Ser. No. 08/877,375, filed Jun. 17, 1997, now U.S. Pat. No. 6,280,328, U.S. patent application Ser. No. 08/719,651, filed Sep. 25, 1996, now U.S. Pat. No. 5,674,128, and U.S. patent application Ser. No. 09/689,842, entitled "System, Method, and Article of Manufacture for Locating and Communicating with a Patron at a Hospitality Facility," filed concurrently herewith. The contents of all the aforesaid applications are hereby incorporated by reference.

BACKGROUND OF THE INVENTION

A. Field of the Invention

The present invention relates generally to gaming, and more particularly, to a system, method, and article of manufacture for providing patrons with the ability to play games from an off-site location.

B. Background Information

Gaming facilities (e.g., casinos) operate in a highly competitive environment. To maximize revenues, these facilities try to attract new and repeat patrons by making patrons feel welcome and appreciated. For example, these facilities often offer patrons a wide variety of amenities and services other than gaming, such as restaurants and valet services, and entertainment options like concerts and theater events. Moreover, successful gaming facilities must continually update the games, amenities, and services that they offer patrons in order to remain competitive.

New entrants to the gaming industry face even more difficulty. For example, enormous amounts of capitol are necessary to fund the design and development of a new gaming facility. These problems prevent non-gaming type hospitality facilities, such as hotels, motels, amusement parks, theme parks, and resorts, and retail facilities, such as grocery stores and gas stations, from entering the gaming industry.

One way for both gaming facilities to increase revenues and for non-gaming facilities to enter into the gaming industry would be for each to provide patrons with the ability to play from an off-site location (e.g., from home) via an online network (e.g., the Internet). These facilities, however, face many problems associated with providing off-site gaming over an online network.

One problem is that patrons do not have confidence in the security of the online networks, such as the Internet, and thus, are hesitant to provide personal information and/or to purchase wagers over online networks. Another problem is that gaming via online networks, such as the Internet, is not legal in many places. Therefore, these facilities may not be able to provide their patrons with such an ability.

SUMMARY OF THE INVENTION

A gaming method consistent with the present invention may include receiving, from a first client terminal, a purchase request for at least one wager; determining the results of the at least one wager; storing the results of the at least one wager in a database; receiving, from a second client terminal, a request to reveal the results of the at least one wager; and sending the results of the at least one wager to the second client terminal.

Another gaming method consistent with the present invention may include receiving, from a client terminal, a purchase request for a plurality of wagers; determining the results of each of the plurality of wagers; and storing each of the results of the plurality of wagers in a database without sending the results of the wagers to the client terminal.

Still another gaming method consistent with the present invention may include receiving, from a first client terminal, a patron identifier identifying a patron and a purchase request for at least one wager. The method also may include debiting the account balance of a patron account corresponding to the received patron identifier based on the received purchase request and determining the result of the at least one wager. In addition, the method may include storing the result of the at least one wager in a database; receiving, from a second client terminal, the patron identifier identifying the patron and a request for the result of the at least one wager; and sending, to the second client terminal, the result of the at least one wager.

In addition, a computer-readable medium consistent with the present invention contains instructions for causing a computer to perform a gaming method. The gaming method may include receiving, from a first client terminal, a patron identifier identifying a patron; receiving, from the first client terminal, a purchase request for at least one wager; debiting the account balance of a patron account corresponding to the received patron identifier based on the received purchase request; determining the result of the at least one wager; storing the result of the at least one wager in a database; receiving, from a second client terminal, the patron identifier identifying the patron and a request for the result of the at least one wager; and sending, to the second client terminal, the result of the at least one wager.

Furthermore, a gaming system consistent with the present invention may include a plurality of client terminals and a server, connected to each of the plurality of client terminals. The plurality of client terminals may include means for receiving, from a patron, a patron identifier identifying a patron and a purchase request for a plurality of wagers, and means for transmitting the patron identifier and the purchase request. The server may include means for receiving, from the plurality of client terminals, the patron identifier and the purchase request, means for debiting the patron account corresponding to the patron identifier in response to the purchase request, means for determining results of the plurality of wagers, and means for storing the results of the plurality of wagers.

Moreover, another gaming system consistent with the present invention may include a plurality of client terminals and a server that is connected to each of the plurality of client terminals. The client terminal may include an identification component for receiving, from a patron, a patron identifier identifying a patron, an output device for displaying a selection menu including an option to purchase a plurality of wagers, an input device for receiving, from a patron, a purchase request for a plurality of wagers, and a first communications device for transmitting the patron identifier and the purchase request. The server may include a second communications device for receiving, from the plurality of client terminals, the patron identifier and the purchase request, a communications component for debiting the patron account corresponding to the patron identifier in response to the purchase request, a wagering component for determining the results of the plurality of wagers, and a database for storing the results of the plurality of wagers.

Furthermore, another gaming system consistent with the present invention may include a plurality of on-site client terminals for receiving a wager purchase request; a server, connected to each of the plurality of client terminals for receiving wager purchase requests, determining the results of the purchased wagers, and storing the results of the purchased wagers; and a plurality of off-site client terminals, connected to the server via an online network, for retrieving the results of the purchased wagers from the server.

Another computer readable medium consistent with the present invention may include instructions for causing a computer to perform a gaming method. The method may include receiving, from a client terminal, a patron identifier identifying a patron; receiving, from the client terminal, a purchase request for a plurality of wagers; debiting the account balance of a patron account corresponding to the received patron identifier based on the received purchase request; determining the results of each of the plurality of wagers; and storing each of the results of the plurality of wagers in a database.

In addition, a server consistent with the present invention may be connected to a plurality of client terminals in a gaming system. The server may include means for receiving, from a first client terminal, a purchase request for at least one wager; means for determining the results of the at least one wager; means for storing the results of the at least one wager; means for receiving, from a second client terminal, a request to reveal the results of the at least one wager; and means for sending the result of the at least one wager to the second client terminal.

Furthermore, another server consistent with the present invention may be connected to a plurality of client terminals in a gaming system. The server may include a communications component for receiving, from a first client terminal, a purchase request for at least one wager and for receiving, from a second client terminal, a request for the results of the at least one wager; a wagering component for determining the results of the at least one wager; and a database for storing the results of the at least one wager.

Moreover, another server consistent with the present invention may be connected to a plurality of client terminals in a gaming system. The server may include means for receiving, from a client terminal, a purchase request for a plurality of wagers; means for determining the results of each of the plurality of wagers; and means for storing each of the results of the plurality of wagers; wherein the server does not send the results of the wagers to the client terminal.

Still another server consistent with the present invention may be connected to a plurality of client terminals in a gaming system. The server may include a communications device for receiving, from a client terminal, a purchase request for a plurality of wagers; a wagering component for determining the results of each of the plurality of wagers; and a database for storing each of the results of the plurality of wagers; wherein the server does not send the results of the wagers to the client terminal.

Both the foregoing and the following description are exemplary and explanatory, and are intended to provide further explanation of the claimed invention as opposed to limiting it in any manner.

BRIEF DESCRIPTION OF THE DRAWINGS

The accompanying drawings are incorporated in and constitute a part of this specification and, together with the description, explain the principles of the invention. In the drawings.

DETAILED DESCRIPTION

Figure 1:
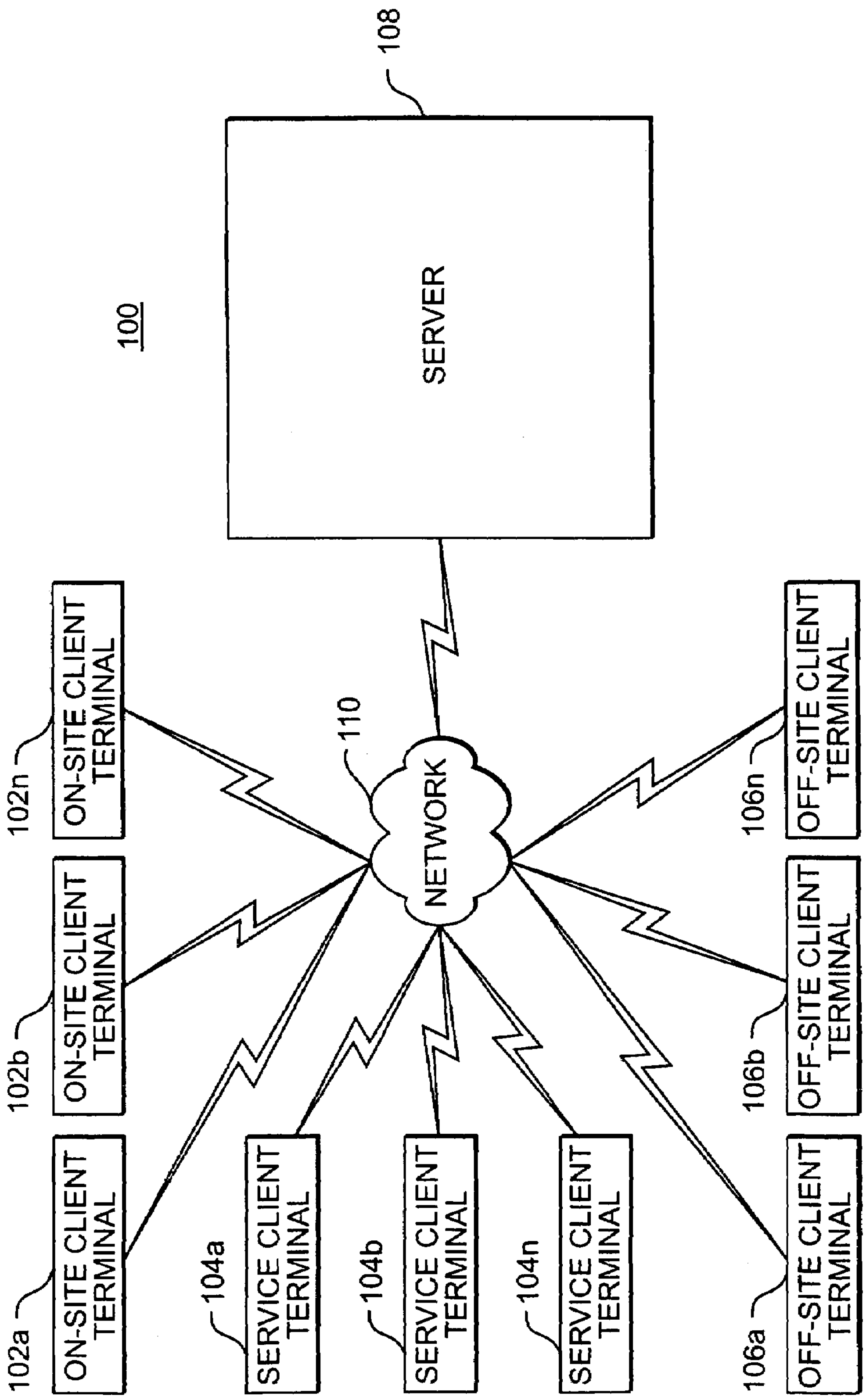
FIG. 1 is a block diagram of an exemplary gaming system consistent with the present invention.

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Systems, methods, and articles of manufacture consistent with the present invention allow a patron to play games from an off-site location (e.g., patron's home) via an online network (e.g., the Internet). For example, systems, methods, and articles of manufacture consistent with the present invention may assign a unique patron identifier (e.g., account number) or a sending device (such as a magnetic card or a transmitter) with a unique patron identifier to each patron. The patron may use the patron identifier or the sending device to log onto a client terminal located at a facility, such as a hospitality facility or a retail facility. To provide security, the patron also may be required to, for example, enter a preestablished personal identification number (PIN) or use biometric authentication.

After logging onto the client terminal, the patron may use an input device at the client terminal to enter a request to purchase at least one wager. The client terminal may then send a wager purchase request to a server. The term wager, as used in this application, refers to playing one game (e.g., one pull on a slot machine type game). As part of the purchase request, the patron may be required to specify selection information, such as a purchase amount, number of wagers, and/or a denomination value for each wager. After the server receives the request, it debits the account balance corresponding to the patron's account based on the request, for example, by subtracting the purchase amount from the patron's account balance. Then, the server immediately determines the result of each wager by using one of a number of different known methods and stores the result of each wager in a transaction history file corresponding to the patron's account.

Once the results of the wagers have been determined and stored by the server on-site, the patron may use an off-site client terminal, such as a computer located at the patron's home, to reveal the results of the wagers. The off-site client terminal connects to the on-site server via a public network, such as the Internet. The server identifies the proper patron account and transaction history file through receipt of the patron identifier. To provide additional security, the patron may be required to enter authentication information, such as a preestablished PIN, or use biometric authentication. The results of the wagers may be revealed to the patron by using a reveal component, such as a black jack, a keno, or a slot machine type (e.g. spinning reel or multi-line) graphical user interface application, which may be stored on the off-site client terminal. The server may send the result of each wager to the reveal component, which may in turn display a different graphical user interface depending on whether the result was a win or a loss. The patron may continue to reveal the remaining wagers or stop playing at any time. After the patron has finished playing, the patron may go back to the facility to collect his or her account balance, which may be adjusted by an amount reflecting any money won or lost by the patron when he or she revealed any wagers.

Systems, methods, and articles of manufacture consistent with the present invention receive wager purchase requests from patrons at the facility, determine the results of the wagers at the facility, but may reveal the results of the wagers at a location other than at the facility. Furthermore, the results may be stored in the patron's account and revealed by the patron at the facility.

The foregoing and the following examples are intended to be illustrative of the features of the present invention as opposed to limiting it in any manner. Moreover, systems, methods, and articles of manufacture consistent with the present invention are not limited to any particular facility or patron. A facility may include, but is not limited to, a hospitality facility (e.g., gaming facilities, hotels, motels, amusement parks, theme parks, and resorts) and a retail facility (e.g., grocery stores and gas stations). A patron may include, but is not limited to, a guest or customer of the facility.

FIG. 1 is a block diagram of an exemplary gaming system 100 consistent with the present invention. As shown, system 100 may include one or more on-site client terminals 102*a*-102*n*, one or more service client terminals 104*a*-104*n*, one or more off-site client terminals 106*a*-106*n*, and a server 108, which are interconnected by a network 110. In the following description, a single on-site client terminal, a single service client terminal, and a single off-site client terminal are referred to as on-site client terminal 102, service client terminal 104, and off-site client terminal 106, respectively. Moreover, on-site client terminals 102*a*–102*n*, service client terminals 104*a*-104*n*, and off-site client terminals 106*a*-106*n* are collectively referred to as client terminals.

On-site client terminal 102 may be a computer or a similar device that may receive and/or retrieve patron identifiers (e.g., account numbers), receive requests from patrons, display information to patrons, and communicate with server 108. Using on-site client terminal 102, a patron may, for example, purchase wagers and/or perform other tasks, such as play traditional on-site games, locate other patrons, and/or communicate with other patrons in the facility. On-site client terminals 102*a*–102*n* may be located throughout the facility.

In one embodiment, a patron may use on-site client terminal 102 to reveal the results of previously purchased wagers. For example, if the facility is a casino, on-site client terminal 102 may be located at a restaurant in the casino or the patron's hotel room so that the patron can reveal results of previously purchased wagers in a location other than the casino floor. Of course, systems, methods, and articles of manufacture consistent with the present invention may also allow a patron to reveal the results of previously purchased wagers at a client terminal on the casino floor.

In one embodiment, on-site client terminals 102*a*–102*n* may be the player terminals and/or kiosk terminals disclosed in U.S. patent application Ser. No. 09/488,556 ("'556 application"), filed Jan. 21, 2000; the player terminals disclosed in U.S. patent application Ser. No. 08/877,375 ("'375 application"), filed Jun. 17, 1997, now U.S. Pat. No. 6,280,328, and/or U.S. Pat. No. 5,674,128 ("'128 patent"); and/or the patron client terminals disclosed in U.S. patent application Ser. No. 09/689,842, entitled "System, Method, and Article of Manufacture for Locating and Communicating with a Patron at a Hospitality Facility" ("'842 application"), filed concurrently herewith. The contents of all the aforesaid applications are hereby incorporated by reference. Alternatively, on-site client terminals 102*a*–102*n* may be combined with the player terminals, kiosk terminals, and/or patron client terminals disclosed in the aforesaid applications. In still another embodiment, on-site client terminals 102*a*–102*n* may be used to accomplish tasks performed by the player terminals, kiosk terminals, and/or patron client terminals disclosed in the aforesaid applications. For example, a patron may use on-site client terminals 102*a*–102*n* to communicate and/or locate other patrons of the facility, including the patrons that may be on-site and the patrons that may be off-site, for example, the patrons that may be using off-site client terminals 106*a*–106*n* to play games.

As shown in FIG. 1, systems, methods, and articles of manufacture consistent with the present invention also may include one or more service client terminals 104*a*–104*n*. Service client terminal 104 may be a computer or a similar device that may be used to accomplish administrative and management tasks, such as opening accounts for patrons or generating various internal reports. Generally, service client terminals 104*a*-104*n* may be used only by personnel at the facility.

In one embodiment, a patron may purchase wagers at service client terminals 104*a*–104*n*. In another embodiment, a patron may establish an account for another person (e.g., friend or family member) and purchase wagers for the account as a gift. Alternatively, if the person already has an account with the facility, the patron may simply purchase wagers for the account. In this situation, the patron also would need to provide information (e.g, patron name or patron identifier) that identifies the person's account.

In another embodiment, a patron may reveal the results of the purchased wagers at service client terminal 104. For example, if a patron prefers to receive the total amount won or lost after processing of all of the purchased wagers rather than reveal the results one at a time, the patron may ask a clerk at service client terminal 104 for that information.

In one embodiment, service client terminals 104*a*–104*n* may be the service-client stations, customer service stations, the cashier stations, and/or the management and reporting stations disclosed in the '556 application; the cashier station and/or the customer service station disclosed in the '375 application and the '128 patent; and the service client terminals disclosed in the '842 application. Alternatively, the service client terminals 104*a*–104*n* may be combined with a system that includes the service-client stations, customer service stations, the cashier stations, the management and reporting stations, and/or service client terminals disclosed in the aforesaid applications. In still another embodiment, the service client terminals 104*a*–104*n* may be used to accomplish the tasks performed by the service-client stations, customer service station, the cashier station, the management and reporting station, and/or the service client terminals disclosed in the aforesaid applications. For example, service client terminals 104a–104n may communicate with server 108 to transmit new software and software upgrades to on-site client terminals 102a–102n and to remotely reconfigure these client terminals.

As shown in FIG. 1, systems, methods, and articles of manufacture consistent with the present invention also may include one or more off-site client terminals 106a–106n. Off-site client terminal 106 may be a computer or a similar device. Off-site client terminals 106a–106n are located outside of the facility, for example, at a patron's home. Using an off-site client terminal 106, a patron may reveal the results of previously purchased wagers and/or perform other tasks, such as communicating and/or locating other patrons at a facility or other patrons who may be logged onto other off-site client terminals 102a–102n. In one embodiment, the off-site client terminal 106 also may be used to purchase wagers.

As shown in FIG. 1, systems, methods, and articles of manufacture also may include server 108. Server 108 may be a computer or a similar device that maintains and controls on-site client terminals 102a–102n, service client terminals 104a–104n, and off-site client terminals 106a–106n. In addition, server 108 may receive a wager purchase request, debit a patron' account balance based on the purchase request, determine the results of each wager, store the results of each wager in a transaction history file corresponding to the patron's account, and/or receive and process wager reveal requests. In an alternative embodiment, server 108 may send wager purchase and/or reveal requests to another server or system for processing.

Server 108 may include a database for storing patron account files for each patron. Each patron account file may include, for example, the patron's identifier (e.g., account number), the patron's identification information (e.g., name, address, and/or date of birth), the patron's preference information (e.g., preferred beverage, snack, language, restaurant, and/or golf course), and a transaction history file for storing the results of purchased wagers.

Server 108 may be located in a secured area of the facility, accessible by authorized personnel only. In the embodiment of FIG. 1, only one server 108 is shown. As the size of system 100 grows, however, additional servers may be added. These additional servers may assist with load balancing. Moreover, some servers may be used for on-site requests and others may be used for off-site requests. For example, some servers may be used to process wager purchase and reveal requests that are received from on-site client terminals 102a–102n and others may be used to process wager purchase and reveal requests that are received from off-site client terminals 106a–106n.

In one embodiment, server 108 may be the transaction processor subsystem disclosed in the '556 application, and/or the central control network disclosed in the '375 application and/or the '128 patent. Alternatively, server 108 may be combined with a system that includes the amenities server and/or transaction processor subsystem disclosed in the '556 application; the central control network, the games server, and/or the terminal server disclosed in the '375 application and/or the '128 patent; and/or server 110 disclosed in the '842 application. In still another embodiment, server 108 may be used to accomplish tasks performed by the amenities server and/or transaction processor subsystem disclosed in the '556 application; the central control network, the games server, and/or the terminal server disclosed in the '375 application and/or the '128 patent; and/or server 110 disclosed in the '842 application. For example, server 108 may assist a patron in locating other patrons and/or communicating with other patrons.

Figure 2:
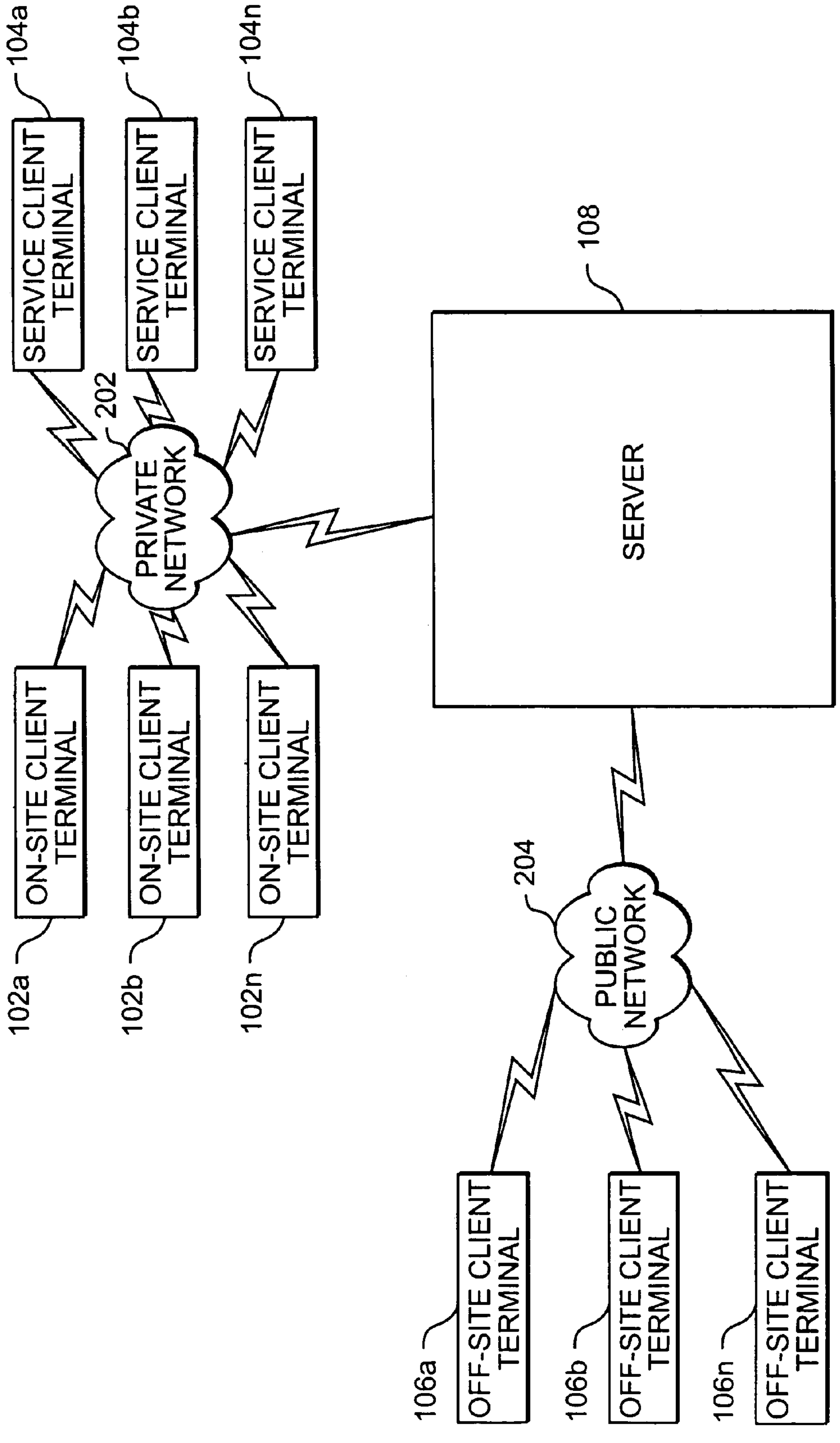
FIG. 2 is a block diagram of another exemplary gaming system consistent with the present invention.

Network 110 may be a single or a combination of any type of computer network, such as a Local Area Network (LAN) or a Wide Area Network (WAN). For example, network 110 may comprise an Ethernet network operating according to the IEEE 802.3 standard. In addition, network 110 may be a combination of public (e.g., Internet) and private networks. For example, ES as shown in FIG. 2, network 110 may include a public network 204 (e.g., Internet) and a private network 202 (e.g., a LAN). The other components shown in FIG. 2 are similar to the components shown in FIG. 1 and thus, will not be described in further detail. Moreover, in one embodiment, network 110 may be a combination of virtual LANs.

Figure 3:
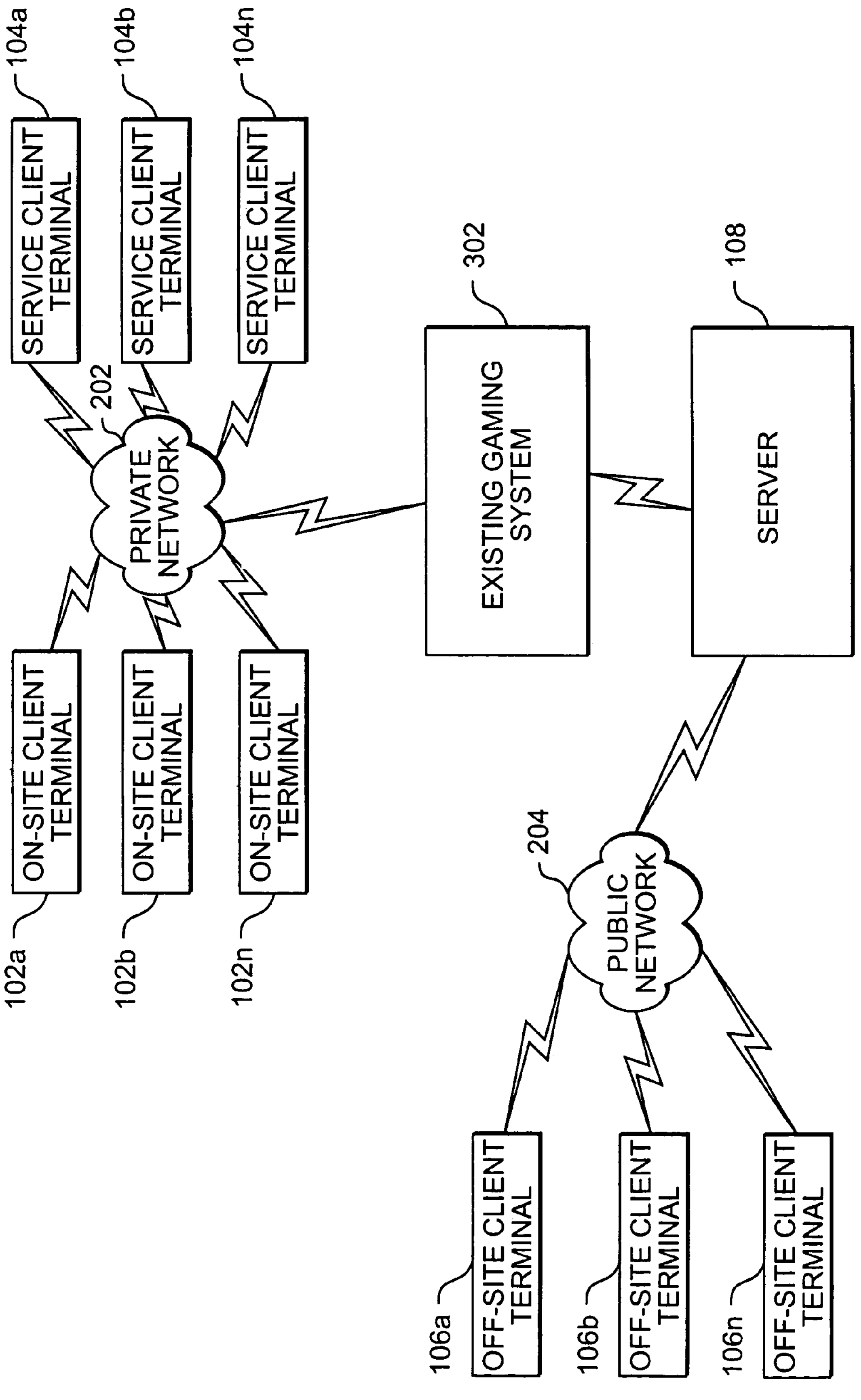
FIG. 3 is a block diagram of another exemplary gaming system consistent with the present invention.

Other system and network configurations will be apparent to those skilled in the art from the foregoing and following description, and thus, are also within the scope of the present invention. For example, as shown in FIG. 3, systems, methods, and articles of manufacture consistent with the present invention may be combined with an existing gaming system 302. The existing gaming system 302 may be any gaming system, such as the video game system disclosed in the '556 application and/or the cashless gaming system disclosed in the '375 application and/or the '128 patent.

In this example, a patron may use a client terminal that exists in the existing gaming system 302 or system 100 to send a wager purchase request to the existing gaming system 302. Upon receiving the wager purchase request, the existing gaming system 302 may forward the request to server 108 along with the patron's patron identifier. The request may include, for example, the purchase amount. Server 108 may receive the request and the patron identifier. Server 108 may then determine the number of wagers that may be purchased based on the request, for example, using the purchase amount. Next, server 108 may determine the result of each wager and store the result of each wager in the transaction history file corresponding to the received patron identifier. After the results have been stored, the patron may use a on-site client terminal 102 or an off-site client terminal 106 to reveal the results of the purchased wagers. In an alternative embodiment, the wager purchase request may be automatically generated whenever the patron logs off the client terminal in existing system 302. In this embodiment, the existing system 302 may send the patron's account balance, which may be used as the purchase amount, the wager purchase request, and the patron identifier to server 108.

One skilled in the art would appreciate that systems, methods, and articles of manufacture consistent with the present invention also may be implemented either singly or in combination with the inventions disclosed in the '556 application, '375 application, '128 patent, and/or the '842 application.

While the components of FIGS. 1–3 are shown as logical devices, one skilled in the art would readily understand that each is associated with a respective physical device. For example, as described in the foregoing description, server 108 may be a physical device, such as a computer. Also, it will be known to those skilled in the art that the components of system 100 may use a single or a combination of protocols and technologies to communicate with each other. For example, server 108 and client terminals may use Hypertext Transfer Protocol (HTTP) and Transmission Control Protocol/Internet Protocol (TCP/IP) for transport and Hypertext Markup Language (HTML) for presenting information to patrons.

In accordance with one embodiment of the present invention, a patron wishing to use system 100 may establish a patron account for storage in server 108. This account may be established, for example, at a service client terminal 104, which may be located, for example, at the front desk of a hotel. In one embodiment, the service client terminal 104 may be operated by an employee of the facility. In another embodiment, the service client terminal 104 may be unmanned, obtaining information from a patron through a series of interactive menus. To establish an account, the patron may need to provide some identifier information (e.g., name, address, and/or date of birth) and preference information (e.g., preferred beverage, snack, language, restaurant, and/or golf course). Once the patron provides the requested information, service client terminal 104 sends the information to server 108, which in turn establishes a patron account file for the patron and issues the patron a unique patron identifier. A patron identifier may include letters, numbers, or a combination of both. In addition, during account establishment, the patron may be asked to select a personal identification number ("PIN") via an input device, such as a keypad.

In another embodiment, the patron identifier may be stored on a sending device (e.g., magnetic card) and the sending device may be given to the patron. In still another embodiment, in addition to storing the patron identifier, an encrypted version of the PIN also may be stored on the sending device.

The sending device may be a magnetic card, a smart card, a credit card, a debit card, a radio frequency transmitter, an infrared frequency transmitter, a magnetic device, or a similar device that can store a patron identifier. In addition, the sending device may comprise jewelry (such as a watch, a pin, a bracelet, a tie clip, or a belt buckle) with a transmitter or some other promotional item (such as a key fob) with a transmitter. In one embodiment, sending device may transmit a patron identifier to, for example, an identification component of the client terminals.

For some types of sending devices, a number preassigned to the sending device may be used as the unique patron identifier and thus, server 108 need not generate a patron identifier. For example, if the sending device is a credit card or a debit card, the account number imprinted on the credit card or debit card may be used as the patron identifier.

In another embodiment, the patron's identifier information and preference information could be sent to the system 100 before the patron arrives at the facility, for example, via the Internet, so that the patron's account would be ready when the patron arrived at the facility.

Figure 4:
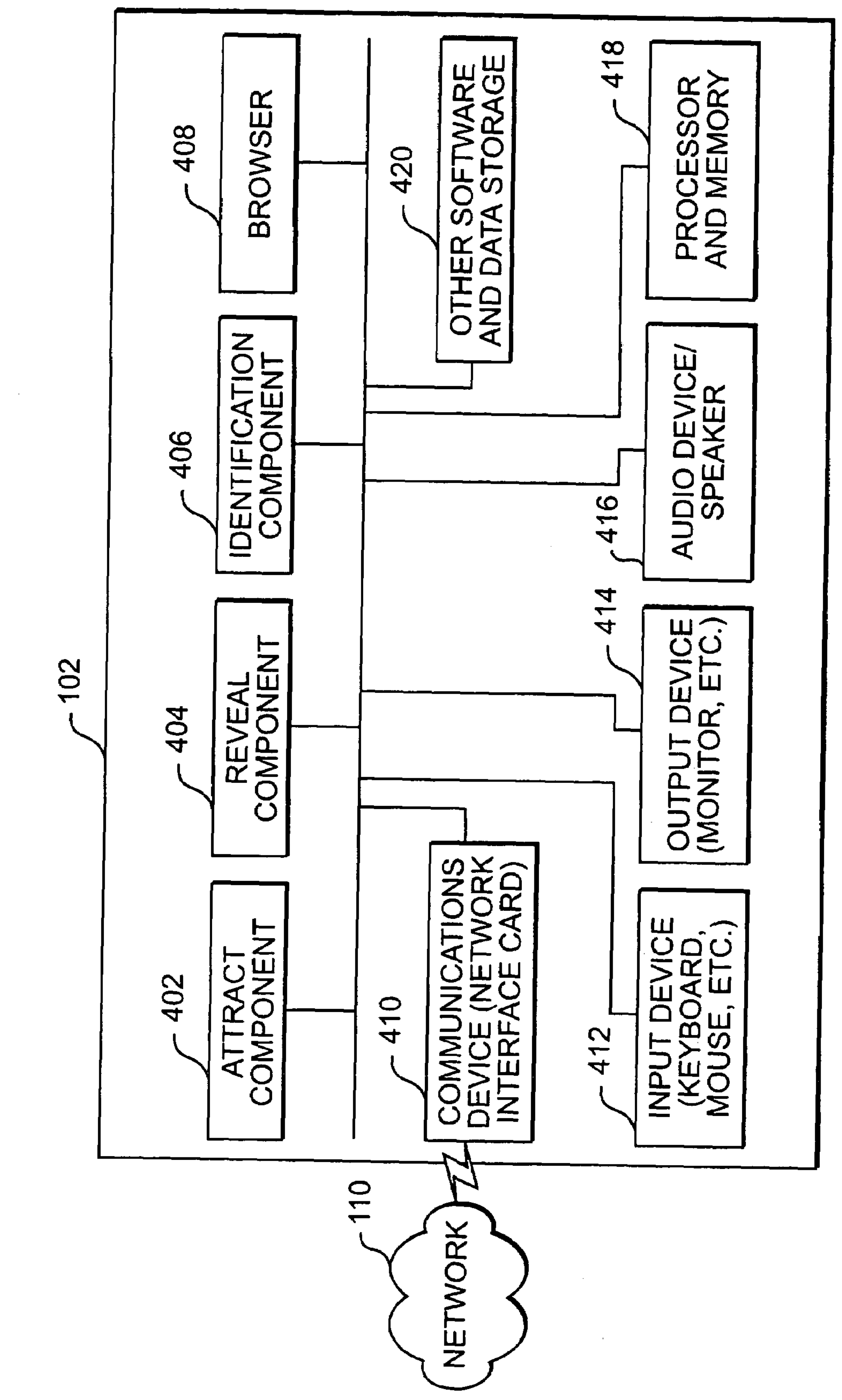
FIG. 4 is a block diagram of an exemplary client terminal consistent with the present invention.

FIG. 4 is a block diagram of an exemplary on-site client terminal 102 consistent with the present invention. As shown, on-site client terminal 102 may include an attract component 402, a reveal component 404, an identification component 406, a browser 408, a communications device 410, an input device 412, an output device 414, an audio device/speaker 416, processor and memory 418, and/or other software and data storage 420.

Attract component 402 may comprise a software application for displaying attract mode graphics to attract a patron to on-site client terminal 102.

Reveal component 404 may comprise a software application running electronic games, such as keno, black jack, or a slot machine type (e.g., spinning reel or a multi-line reveal) game. A patron may use the reveal component 404 to reveal the results of previously purchased wagers. The server 108 may send the result of each wager to the reveal component 404 and depending on the result, the reveal component may display a particular graphical user interface indicating a win or a loss. For example, if the result of a wager is a win in the amount of $1 and the patron is playing a "spinning fruit" game, which is a type of a spinning reel game, the reveal component 404 may display a graphical user interface (e.g., three apples) that indicates a win amount of $1. On the other hand, if the patron won $0.50, the reveal component 404 may display a graphical user interface (e.g., two apples and one orange) that indicates a win amount of $0.50.

Identification component 406 may be a combination of software and/or hardware and assists a patron in logging onto a client terminal. In one embodiment, the identification component 406 may include a receiving device and a software driver to support the receiving device. The receiving device may include a magnetic card reader, a smart card reader, a radio frequency receiver, an infrared frequency receiver, a magnetic device detector, or any similar device known to those skilled in the art that retrieves or receives patron identifier information. The type of sending device may dictate the type of receiving device.

In another embodiment, the identification component 406 may include a biometric authentication device, such as a fingerprint scanner, to biometrically authenticate the patron. In still another embodiment, identification component 406 may be a software application that interacts with server 108 to authenticate the identity of the patron. For example, identification component 406 may interact with server 108 to prompt a patron for information, such as patron's social security number and/or date of birth, which uniquely identifies the patron. The identification component 406 may send the information to server 108, which may compare the information with the information stored in patron's account file to authenticate the patron's identity. It will be apparent to one skilled in the art that systems, methods, and articles of manufacture consistent with the present invention are not limited to the above described authentication methods.

Browser 408 may include a conventional software application, such as NETSCAPE NAVIGATOR or INTERNET EXPLORER, for issuing HTTP requests to the server 108. For example, browser 408 may request a specific web page or ask the server 108 to perform a database query. Browser 408 also may read HTML codes embedded in the web pages received from the server 108 to determine how, where, and in what colors and fonts the elements on the web pages must be displayed. In one embodiment, instead of using the reveal component 404, a patron may use browser 408 to reveal the results of previously purchased wagers. In still another embodiment, a patron may use browser 408 in combination with reveal component 404 to reveal the results of previously purchased wagers.

Communications device 410 may include an interface device that transmits information from the on-site client terminal 102 to network 110 and receives information that is addressed to on-site client terminal 102 from network 110. For example, communications device 410 may be a network interface card or a modem. In one embodiment, when sending information, communications device 410 may break the information into packets that are sent across a TCP/IP network 110 to the server 108. In addition, communications device 410 may check for errors in transmission using, for example, cyclical redundancy check ("CRC").

Input device 412 may include a device that is used for receiving input from a patron. For example, input device 412 may include a keyboard, a keypad, or a pointing device (e.g., a mouse or a trackball). A keypad may comprise a conventional alphanumeric or numeric key entry device. An input device may not be necessary, however, because the patron may be able to use output device 414, for example, if the output device 414 includes a touch screen.

Output device 414 may include a device that displays information to users and/or receives inputs from users. For example, output device 414 may comprise a conventional touch screen video monitor for displaying video graphics and receiving patron inputs, such as a PIN. A touch screen may not be necessary, however, since patron inputs can be made through an input device 412.

On-site client terminal 102 also may include an audio device/speaker module 416 that comprises a conventional audio card, amplifier, and/or speaker for presenting audio. In addition, on-site client terminal 102 also may include processor and/or memory 418. The memory may include ROM (Read Only Memory) and/or RAM (Random Access Memory). The processor may control the components of client terminal 102 and assist in processing requests received from components. Furthermore, on-site client terminal 102 may include other software and data storage 420, such as an operating system.

It will be apparent to one skilled in the art that on-site client terminal 102 may include some or all the components shown in FIG. 4. For example, in a facility that does not want patrons to have the ability to reveal the results of previously purchased wagers on-site, the on-site client terminals 102*a*–102*n* may not include the reveal component 404. Moreover, it will be apparent to one skilled in the art that on-site client terminal 102 may include additional components not shown in FIG. 4. For example, client terminal 104 may include a printer device to print, for example, information received from the server 108. In addition, on-site client terminal 102 also may include head phones, for example, to listen to messages, and text-to-speech and/or speech-to-text conversion software, respectively, to listen to received messages and/or to send messages.

Furthermore, although not shown, the service client terminal 104 and the off-site client terminal 106 also may include some or all of the components that are included in the on-site client terminal 102 shown in FIG. 4. In one embodiment, service client terminal 104 also may include a device that can write to the sending device. For example, if the sending device is a magnetic card, service client terminal 104 may include a magnetic card issuance system like the one disclosed in the '556 patent application. Service client terminal 104 also may include a scanning device for scanning and storing a patron's signature or photograph or scanning a patron's drivers license. In another embodiment, service client terminal 104 may include recognition software to detect the patron's identifier information, such as name, address, and/or date of birth, from the patron's drivers license.

Figure 5:
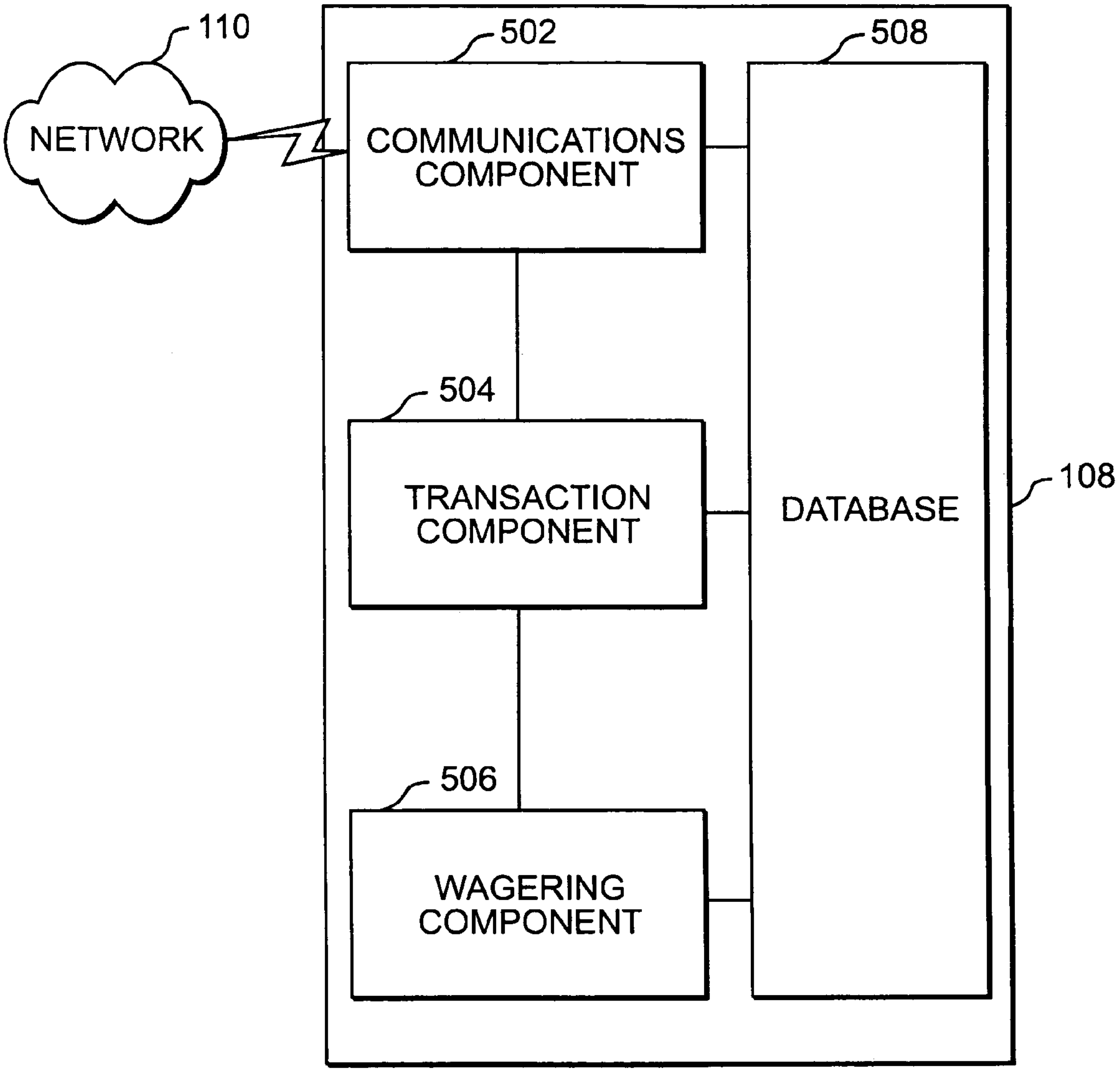
FIG. 5 is a block diagram of an exemplary server consistent with the present invention.

FIG. 5 is a block diagram of an exemplary server 108 consistent with the present invention. As shown, server 108 may include a communications component 502, a transaction component 504, a wagering component 506, and a database 508.

Communications component 502 may include a combination of software and hardware devices, such as a web server and a network interface card. Communications component 502 may receive messages from and send messages to client terminals. Communications component 502 may identify a patron by comparing, for example, the patron's patron identifier to the patron account and then, authenticating the patron by comparing, for example, the patron's PIN, to the patron account. Communications component 502 also may decode, decrypt, and error check messages received from client terminals. It also may encode and encrypt messages to client terminals.

Communications component 502 also may act as an interface between the client terminals and the other components of the server 108. In one embodiment, communications component 502 may send messages, such as wager purchase and reveal requests, to the transaction component 504 and/or wagering component 506 for further processing. In another embodiment, communications component 502 may retrieve results of previously purchased wagers from database 508 and send these results to the client terminals. Although not shown, communications component 502 may include a database interface for writing information into and retrieving information from database 508. In still another embodiment, the communications component may determine if the patron account has sufficient balance to purchase wagers and if it does have sufficient balance, may debit the patron's account for the purchase amount and then, send the request to wagering component 506 for further processing. If the patron's account does not have sufficient balance, the communication component 502 may send a message to the client terminal for display to the patron notifying the patron that the patron has insufficient finds.

Transaction component 504 may receive requests from communications component 502 and may forward the requests to wagering component 506. Transaction component 504 generally tracks all transactions being processed by server 108 and may be used in conjunction with service client terminal 104 to generate reports, such as authentication failures or usage reports.

Wagering component 506 receives wager purchase requests from transaction component 504 and/or communications component 502. In addition, wagering component 506 may process the wager purchase request or send the request to another component or server for processing. To process a wager purchase request, the wagering component may calculate the number of wagers if the number was not specified by the patron or if the patron just specified the purchase amount. The number of wagers may be calculated, for example, by dividing the purchase amount by the denomination value. Then, the wagering component determines the result of each wager by using any one of an infinite number of methods. The methods used for determining the result of a wager are well known to those skilled in the art and are within the scope of the present application. Examples include using electronically controlled random number generators or using predefined yet shuffled outcome values (e.g., random multipliers). As an example, if predefined yet shuffled outcome values, such as random multipliers, are used, and if a patron purchases ten wagers, the result of each of the ten wagers may be calculated by multiplying the denomination value of each wager by the corresponding random multiplier, as shown in Table 1 below:

TABLE 1

| Wager No. | Denomination Value | Random Multiplier | Result |
|---|---|---|---|
| 1 | $1 | 0 | 0 |
| 2 | $2 | 2 | 4 |
| 3 | $3 | 0 | 0 |
| 4 | $2 | 6 | 12 |
| 5 | $2 | 2 | 4 |
| 6 | $3 | 0 | 0 |
| 7 | $3 | 9 | 27 |
| 8 | $2 | 0 | 0 |
| 9 | $2 | 0 | 0 |
| 10 | $1 | 0 | 0 |

In another embodiment, wagering component 506 may include some or all the components of the manufacturing server disclosed in the '556 application and/or may interact with the manufacturing server to request a number of scratch tickets equivalent to the number of wagers requested by a patron and then, determine the results of each of the scratch tickets.

Server 108 also may include a database 508. Database 508 stores patron account files, each patron account file including a patron identifier and a transaction history file. As the wagering component 506 determines the result of each wager, it stores the result in the appropriate transaction history file in database 508 so that the results can later be revealed using this transaction history file. Database 508 may also store graphical menus and other multimedia information.

Although not shown, it will be apparent to one skilled in the art that server 108 may include other components, such as an output device (e.g., monitor), input device (e.g., keyboard and pointing device), network operating system, and a database server. The network operating system may include a conventional network operating system, such as WINDOWS NT SERVER. The network operating system may process requests from client terminals, monitor network hardware and software, coordinate communication in the network, and provide transaction security. The database server may build and maintain database 508. In addition, the database server may retrieve from database 508 patron account information, graphical menus, and other multimedia information to respond to requests from the client terminals. Furthermore, the database server may be a SQL (Structured Query Language) server.

Figure 6A:
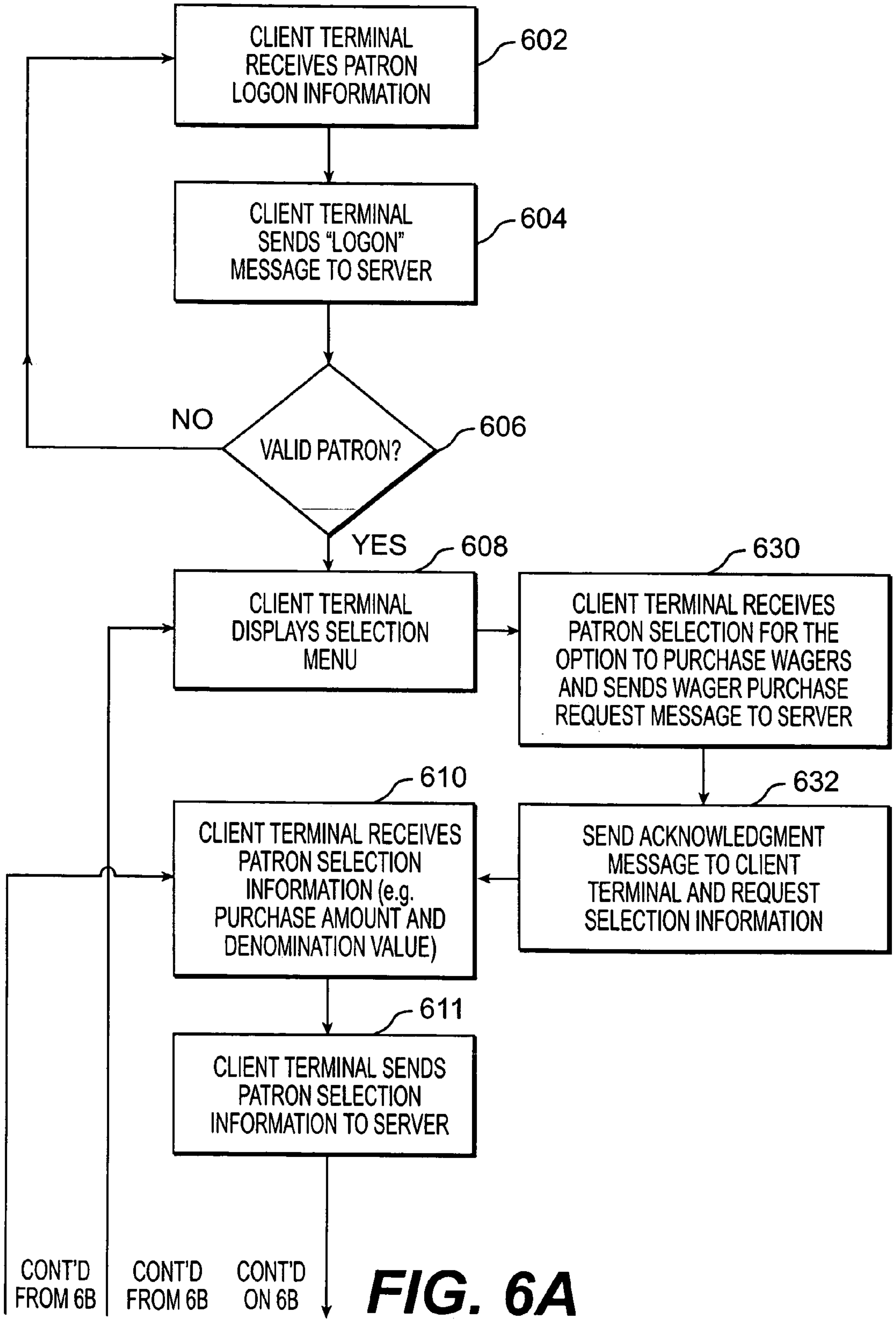
FIGS. 6–8 are flow diagrams of an exemplary method of operating a system consistent with the present invention.
Figure 6B:
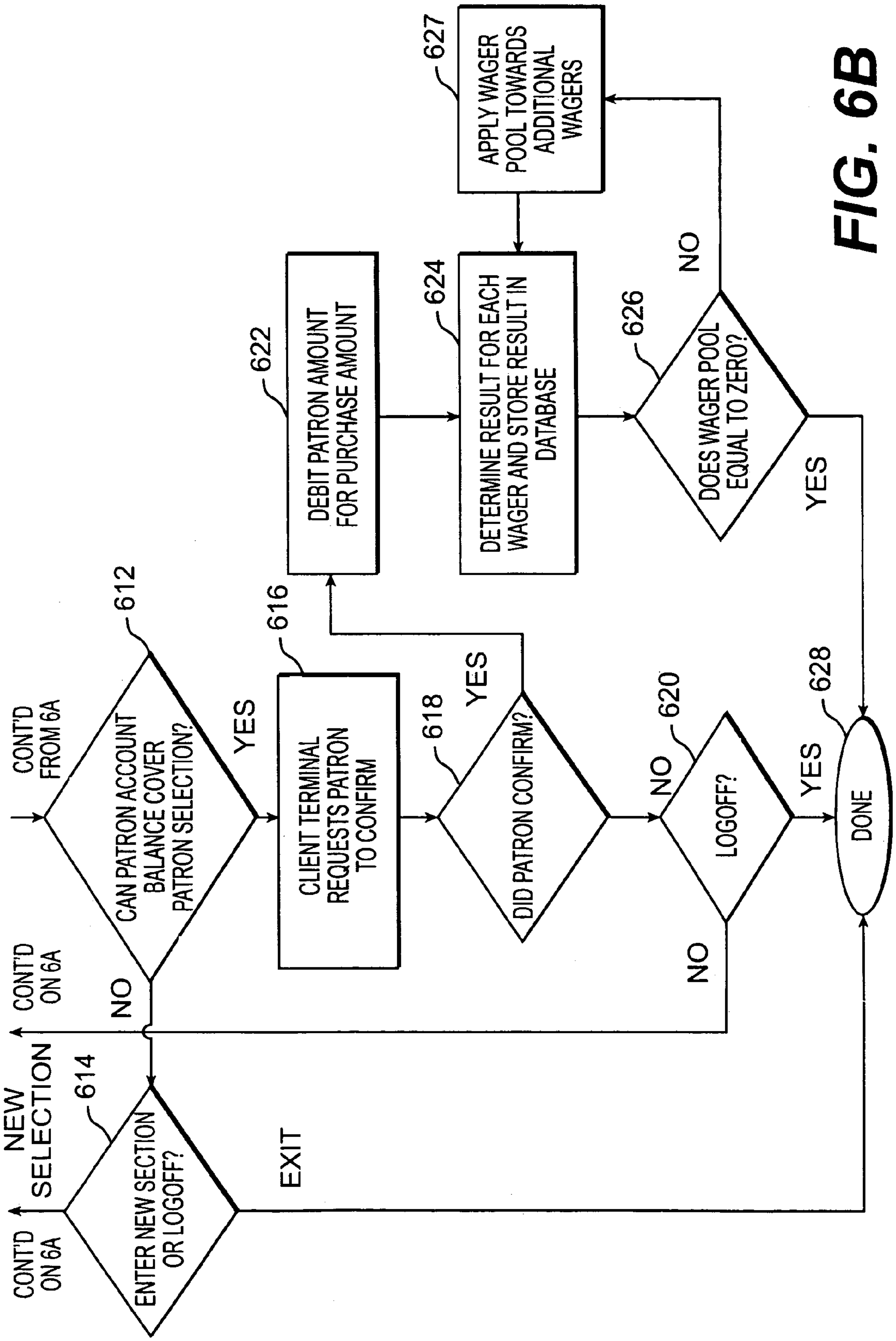
Figure 7A:
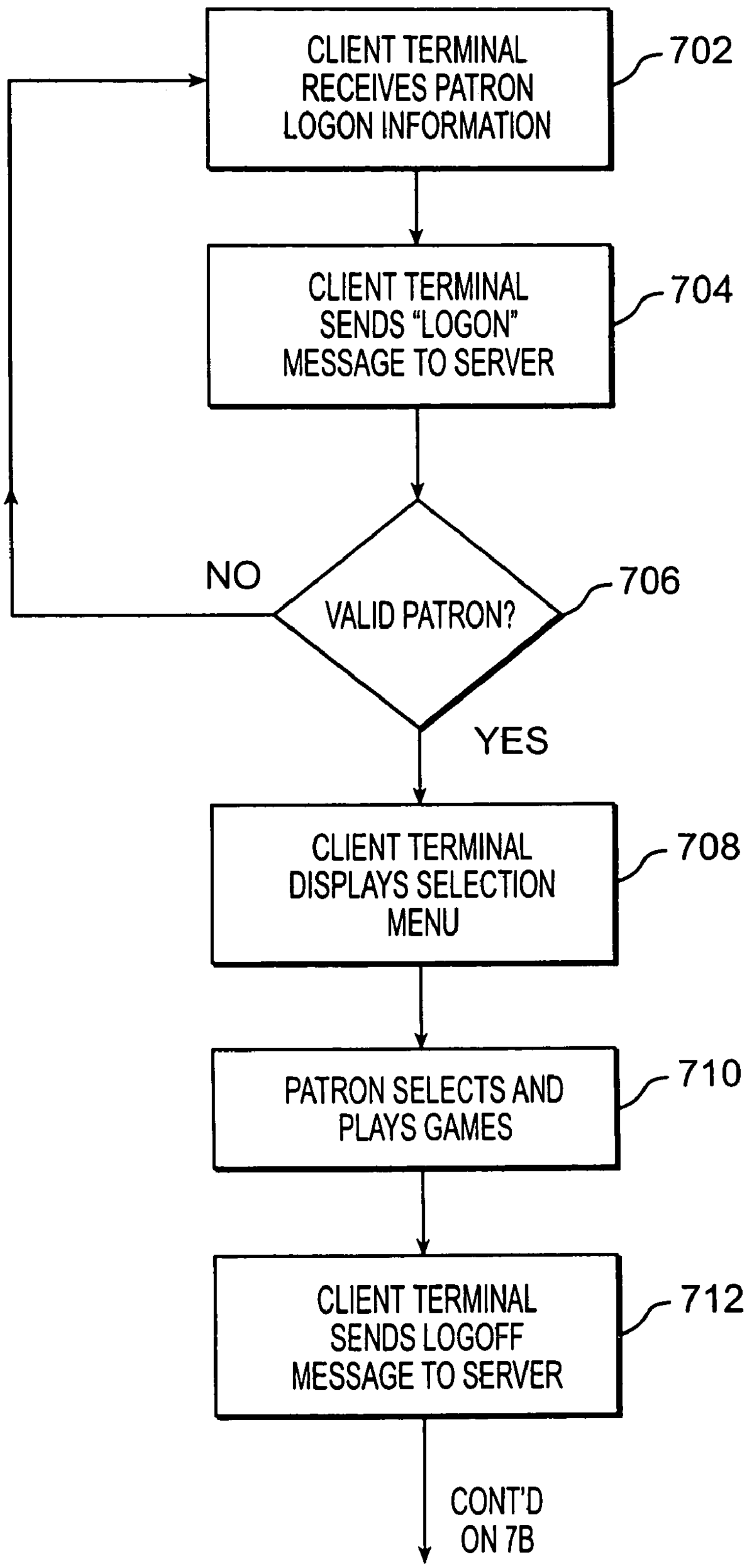
Figure 7B:
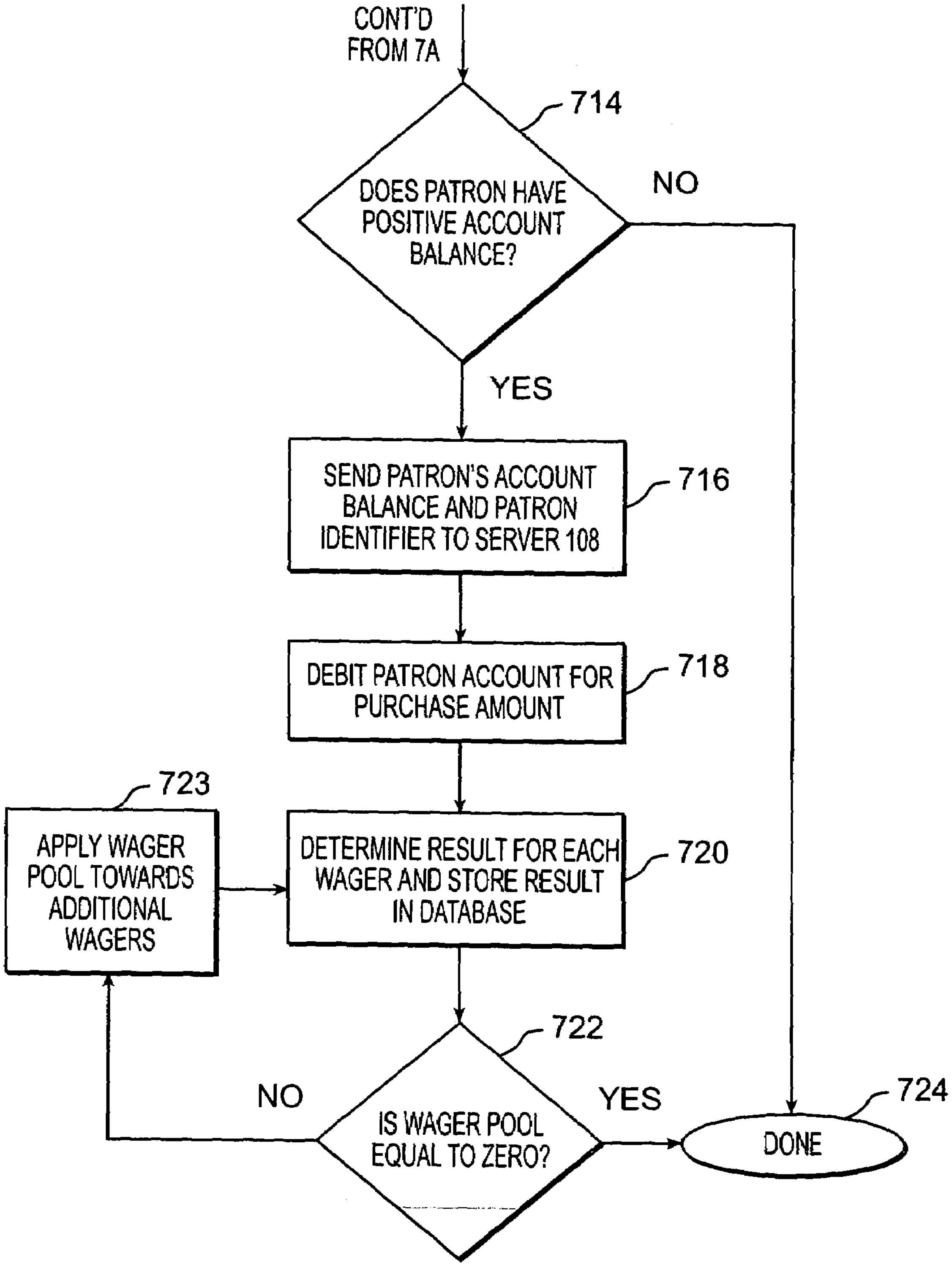

FIGS. 6–7 are flow diagrams of an exemplary method of operating a system consistent with the present invention. In the exemplary method of FIGS. 6–7, it is assumed that the patron already has established an account with system 100. Moreover, in the following description, the use of the term client terminal includes both on-site client terminal 102 and off-site client terminal 106.

The patron may log on at the client terminal by entering logon information such as his/her patron identifier (step 602). The client terminal may then send a "logon" message, including the patron identifier, to server 108 (step 604). Although not shown in FIG. 6, if the client terminal is not connected to server 108, a connection may be then established, for example, by using the communications device 410 (e.g., modem). The server 108 receives the "logon" message and may then determine whether the patron identifier corresponds to an established patron account and may also retrieve the account file corresponding to the patron identifier from database 508 (step 606).

The method by which the patron enters the logon information may vary depending on the sending device and receiving device. For example, if the sending device is an infrared or radio frequency transmitter, the patron may not need to take any action to enter the logon information as long as the transmitter can communicate with a receiver. On the other hand, if the sending device is a magnetic card, the patron may need to insert the card into a receiving device, such as a card reader, to log onto the client terminal. Alternatively, if sending and receiving devices are not used, the patron may be required to enter, for example, his or her patron identifier.

Although not shown in FIG. 6, in response to the logon message from the client terminal, server 108 may send to the client terminal an authentication message requiring the patron to authenticate his or her identity using, for example, a biometric device such as, a finger print scanner. In another embodiment, if the patron selected a PIN during account establishment, the patron may need to enter the PIN to log onto the client terminal and authenticate his or her identity. Alternatively, the patron may be required to provide other information, such as social security number, to authenticate his or her identity. These and other authentication methods will be apparent to those skilled in the art from the foregoing and following description, and thus, are also within the scope of the present invention.

Although not shown in FIG. 6, the client terminal sends the authentication information that the patron provided and/or the client terminal retrieved from a sending device to server 108. Next, server 108 compares this information to the information stored in the patron's account file to authenticate the identity of the patron.

If the logon information and authentication information sent by the client terminal match the information in database 108, the server sends a selection menu to the client terminal for display to the patron (steps 606 and 608). On the other hand, if the information is not correct, the patron may be asked to provide logon and/or authentication information again (steps 602, 604, 606). It will be apparent to one skilled in the art that a patron only may be given a selected number of attempts to log onto the client terminal and that the patron may be asked to contact a person affiliated with the facility after a few unsuccessful attempts.

After the client terminal displays the selection menu, the client terminal may receive, from the patron, a selection for the option to purchase wagers (step 630). In response, the client terminal may send a wager purchase request message to server 108 (step 630). Server 108 may send an acknowledge message to the client terminal, requesting additional information concerning the purchase of the wager (step 632). Although not shown, the client terminal may then prompt the patron to enter selection information. The selection information may include a purchase amount, a denomination value, and/or number of wagers that the patron desires to purchase.

Next, the client terminal receives, from the patron, selection information (step 610). The purchase amount is the total amount of money that the patron wants to spend on wagers and the denomination value is the value of each wager. For example, if a patron wants to buy $10 worth of $1 wagers, the purchase amount would be $10 and the denomination value would be $1.

In one embodiment, the patron may be required to only submit a purchase amount. In this embodiment, server 108 may either use a denomination value specified by the facility or use the patron's normal wager amount as the denomination value. The normal wager amount, for example, may be the average denomination value of a patron's previous wagers and may be stored in database 508 along with the patron's other preference information. In another embodiment, if the patron is required to only submit a denomination value and number of wagers that the patron desires to purchase, the purchase amount may be calculated by multiplying the denomination value by the number of wagers that the patron desires to purchase. In still another embodiment, the server 108 may ignore the denomination value, if any, provided by the patron and use a low denomination value, such as 5 cents. By using a low denomination value, systems, methods, and articles of manufacture consistent with the present invention allow the patron to vary the denomination value when revealing the results. This embodiment will be further described in detail along with the reveal process shown in FIG. 8.

The client terminal may send the patron selection information to server 108 (step 611). Next, server 108 determines whether the patron's account balance can cover the patron selection (step 612). If the patron's account balance cannot cover the patron selection, server 108 may send an "insufficient funds message" to the client terminal (step 612). The client terminal may then display a message to the patron (indicating, for example, that purchase amount exceeds the patron's account balance) and prompts the patron to enter a new selection or logoff (step 614). If the patron elects to logoff, the purchasing process is complete (steps 614 and 628). Conversely, if the patron elects to enter a new selection, the client terminal sends the new selection information to server 108 (steps 614, 610, and 611). Systems, methods and articles of manufacture consistent with the invention may also allow the patron to deposit more funds into his or her account to cover the difference between the patron's account balance and selection.

On the other hand, if the patron account balance covers the patron selection, the client terminal may prompt the patron to confirm his or her selection (step 616). If the patron does not confirm, the patron may either logoff or return to the selection menu (steps 618 and 620). If the patron desires to logoff, the client terminal sends a logoff message to server 108 (steps 620 and 628). On the other hand, if the patron does not wish to logoff, the client terminal may display the selection menu (steps 620 and 608). It will be apparent to one skilled in the art that systems, methods, and articles of manufacture consistent with the present invention need not give patrons the option of confirming their selections after entry of the patron selection.

After the patron confirms the selection information (step 618), the client terminal sends a "confirmation" message to server 108. Server 108 may then debit the patron's account for the purchase amount (step 622). Although not shown, if the patron did not specify the number of wagers that the patron desires to purchase, server 108 may then calculate the number of wagers by dividing the purchase amount by the denomination value. These wagers are referred to in this application as mandatory wagers. Next, server 108 may determine the result of each mandatory wager and store each result in a transaction history file corresponding to the patron's account file (step 624). Each result may be determined using one of an infinite number of methods, as described in the foregoing description.

For example, if the purchase amount equals $10 and the denomination equals $1, server 108 may first debit the patron's account for $10 (step 622). Server 108 may then determine the number of mandatory wagers by dividing the purchase amount by the denomination value. In this example, the number of mandatory wagers is equal to 10. Server 108 may then determine the results of each of the ten $1 wagers and store the results in a transaction history file that may include two columns, as shown in Table 2. The two columns in Table 2 include the wager number and the result of the wager. Other methods of storing results in a transaction history file will be apparent to those skilled in the art from the foregoing and the following description and are also within the scope of the present invention. In addition, the transaction history file might include more or less than two columns of information. Systems and methods consistent with the present invention may use any type of transaction history file that would allow the client terminal to later reveal the results of each wager to a patron.

In the example shown in Table 2, the result of the wager equals the amount won for that individual wager. For example, the result of wager no. 1 is zero. One of ordinary skill in the art would understand, however, that the result of the wager could be other values, such as the amount won minus the denomination amount.

TABLE 2

| Wager No. | Result |
|---|---|
| 1 | 0 |
| 2 | $1 |
| 3 | $2 |
| 4 | $1 |
| 5 | 0 |
| 6 | 0 |
| 7 | 0 |
| 8 | $1 |
| 9 | $2 |
| 10 | $0 |

After determining and storing the result of the ten mandatory wagers, the server 108 determines whether the wager pool is equal to zero (step 626). The wager pool is a sum of the results of the mandatory wagers. Until the wager pool is zero, the server 108 may apply the wager pool towards additional wagers, determine the results of these wagers, and store the results in the database (steps 627, 624, and 626).

In the above example, after determining and storing the result of each mandatory wager, the wager pool is equal to $7. Therefore, in this example, the server 108 would apply the wager pool towards additional seven wagers at $1 each until the wager pool equals zero (step 627, 624, and 626). Moreover, each time the server 108 repeats steps 627, 624, and 626, it adds the results of the wagers to the end of the transaction history file, as shown in Table 3.

After determining and storing the result of the seven additional wagers, the server 108 determines whether the wager pool is equal to zero (step 626). The wager pool is a sum of the results of the seven additional wagers. Until the wager pool equals zero, the server 108 may apply the wager pool towards additional wagers, determine the results of these wagers, and store the results in the database (steps 627, 624, and 626). As shown in Table 3, the new wager pool would be the sum of the results of the last seven wagers, which equals $4. Since the wager pool is not equal to zero, server 108 may repeat steps 627, 624, and 626.

Once the wager pool equals zero, the iterative process of determining the result of a wager, storing the result, and adjusting the wager pool is complete (step 628). Although not shown, server 108 may now send a message to the client terminal notifying the patron that the purchasing process is complete. Moreover, it will be apparent to one skilled in the art that the wager purchase process may be asynchronous. Specifically, once the patron confirms the selection information (step 618), the patron may continue to perform other tasks at the client terminal.

TABLE 3

| Wager No. | Result |
|---|---|
| 1 | 0 |
| 2 | $1 |
| 3 | $2 |
| 4 | $1 |
| 5 | 0 |
| 6 | 0 |
| 7 | 0 |
| 8 | $1 |
| 9 | $2 |
| 10 | $0 |
| 11 | $1 |

TABLE 3-continued

| Wager No. | Result |
|---|---|
| 12 | 0 |
| 13 | 0 |
| 14 | 0 |
| 15 | 2 |
| 16 | 0 |
| 17 | 1 |

Moreover, it will be apparent to one skilled in the art that several modifications may be made to the process shown in FIG. 6 without departing from the scope of the present invention. For example, FIG. 7 is similar to FIG. 6 except that this process applies to a system that includes multiple servers or is combined with an existing system 302, as shown in FIG. 3. Since FIG. 7 is similar to FIG. 6, only the steps that are different will be explained now. After a patron logs onto a client terminal (steps 702, 704, and 706), the patron may be presented with a selection menu (step 708). The patron may select and play games using the existing system (step 710). After the patron is done playing games, the patron logs off and the client terminal sends a logoff message to the additional server or the existing system 302 (step 712). Upon receiving a logoff message from the client terminal, the additional server or the existing system 302 determines whether the patron has a positive account balance (step 714). If the patron does not have a positive account balance, the process is complete (step 724).

On the other hand, if the patron does have a positive account balance (step 714), the additional server or the existing system 302 debits the patron's account balance and sends the patron's account balance along with the patron's identifier to server 108 (steps 716 and 718). In one embodiment, the additional server or the existing system 302 also may send a desired denomination value. Again, the denomination value may be a value that is preset by the facility, based on patron preference, or may be based on the patron's normal wager amount. The server 108 determines the number of mandatory wagers that may be purchased using the account balance, determines results for each wager, and stores the results in a transaction file corresponding to the patron's account file (steps 718, 720, and 722). The rest of the process (steps 723, 720, and 722) is similar to the process (steps 627, 624, and 626) shown in FIG. 6, and thus can be understood by reference to FIG. 6.

Although not shown in FIG. 7, before or after the patron logs off, the client terminal may prompt the patron to elect whether the patron desires to use his or her remaining balance to purchase wagers. Alternatively, when opening his or her account, the patron may be required to sign a statement giving the facility the authority to automatically use the patron's balance to purchase wagers.

In addition, the process in FIGS. 6 and 7 may be modified by removing the steps of continuing to apply the wager pool towards additional wagers until the wager pool equals zero (steps 626 and 627). Alternatively, systems, methods, and articles of manufacture consistent with the present invention may allow the patron to request that the server 108 perform these steps after the client terminal reveals the results of the originally purchased wagers. Other such modifications will be apparent to one skilled in the art and are also within the scope of the present invention.

After completion of the process in FIGS. 6 and 7, the patron has several options. One option is that if the step of applying the wager pool towards additional wagers was removed from the processes described in FIGS. 6 and 7, the patron may go to a service client terminal 104 to get the results, for example, the wager pool. In another embodiment, the patron may use either a client terminal 102 or an off-site client terminal 106 to reveal the results of the purchased wagers. The process of revealing the results of these wagers will be described now in detail by referring to FIG. 8. Again, in the following description, the use of the term client terminal includes both on-site client terminal 102 and off-site client terminal 106.

Figure 8A:
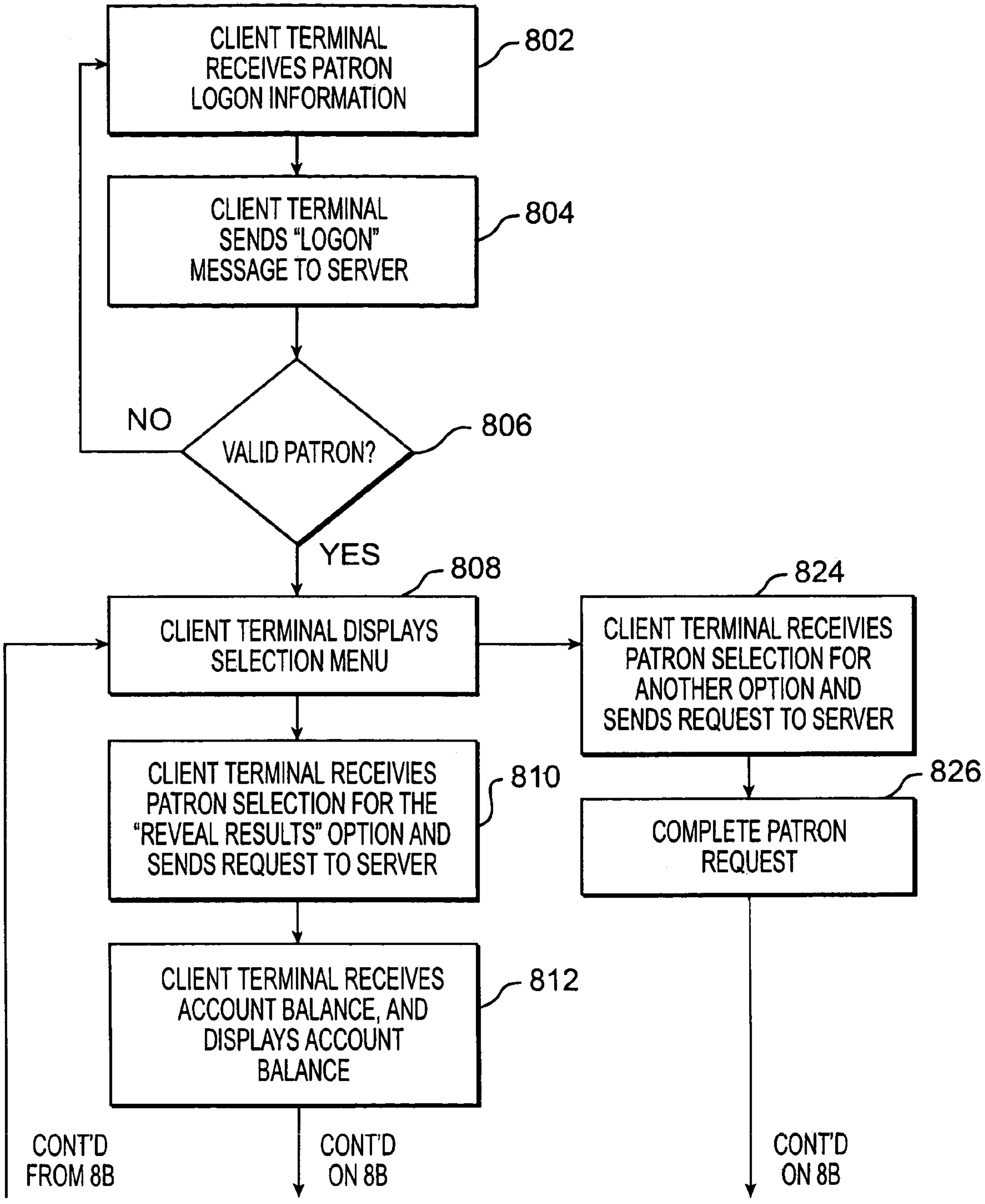
Figure 8B:
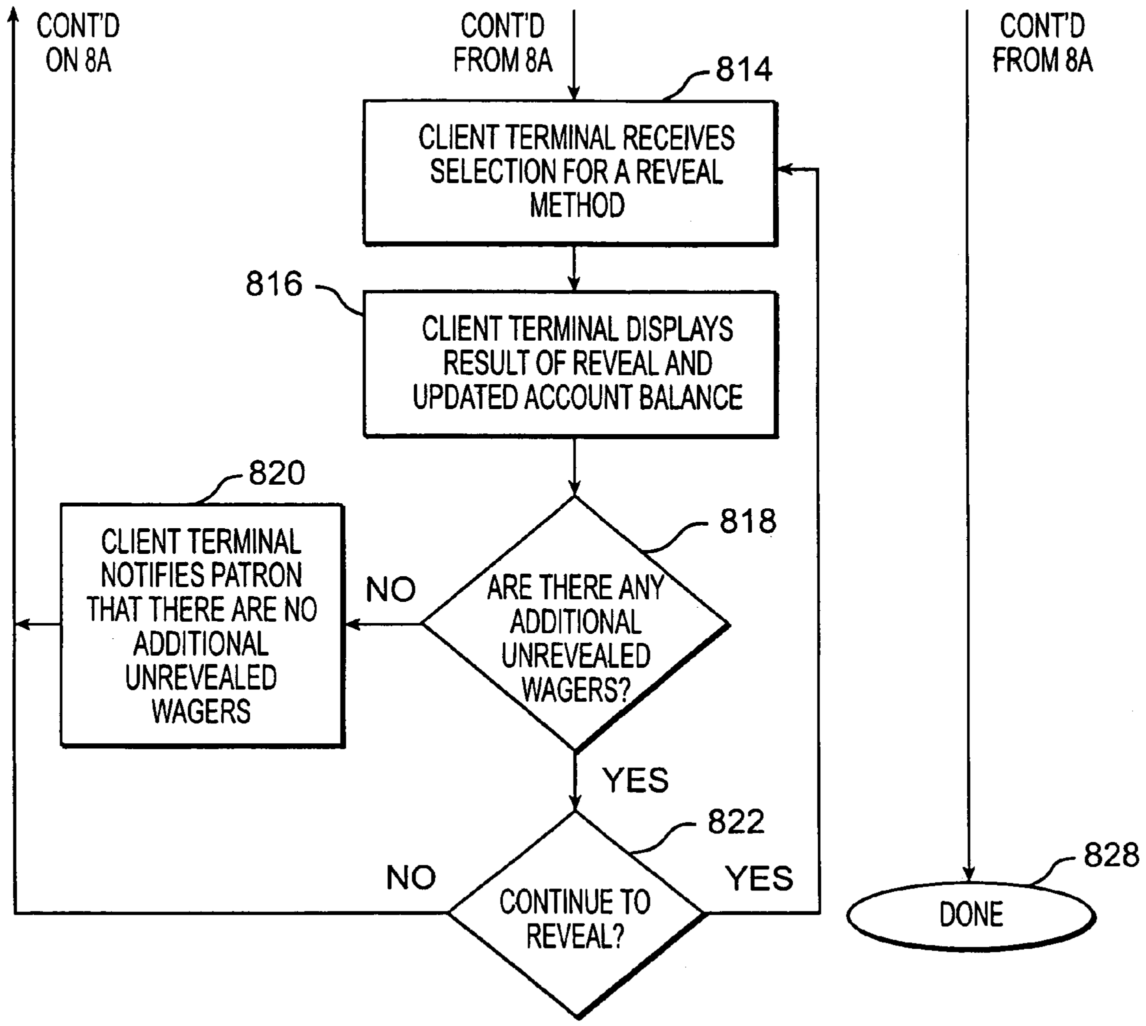

As shown in FIG. 8, the patron may log on at a client terminal by entering logon information such as his/her patron identifier (step 802). Steps 802, 804, and 806 are similar to steps 602, 604, and 606, and thus, will not be further described in detail. If the logon information and authentication information sent by the client terminal match the information in database 108, the server sends a selection menu to the client terminal for display to the patron (steps 806 and 808). Alternatively, the reveal component 404 may include a selection menu, which may be displayed to the patron.

The patron may select, for example, the "Reveal Results" option from the selection menu. The client terminal may receive patron selection for the "Reveal Results" option and send a reveal request to server 108 (step 810). Server 108 receives the request, retrieves the patron's account balance, and sends the account balance to the client terminal. The client terminal in turn displays the account balance to the patron. In addition, although not shown, the client terminal may also display various reveal methods. The reveal methods may be the various games that are part of the reveal component or may be games displayed by server 108, for example, via servlets and java applets. Next, the client terminal receives a selection for a reveal method from the patron (step 814). Once the patron selects the reveal method (step 814), the client terminal sends a request to server 108 for the result of the first unrevealed wager (not shown). The server retrieves the result of the first unrevealed wager from the transaction history file corresponding to the patron's account and sends the result to the reveal component 404 (not shown).

Depending on the result, the reveal component 404 may display a particular graphical user interface indicating a win or a loss and an updated account balance if it the result was a win (step 816). For example, if the result of a wager was a win in the amount of $1 and the patron is playing a "spinning fruit" game, the reveal component 404 may display the graphical user interface (e.g., three apples) that indicates a win amount of $1. On the other hand, if the patron won $0.50, the reveal component 404 may display the combination (e.g., two apples and one orange) that indicates a win amount of $0.50.

On the other hand, instead of sending the result to the reveal component 404, the server may send a particular graphical user interface to a client terminal for display to a user depending on the game and whether the result of the wager was a win or a loss (step 816), for example, by using servlets and java applets.

In addition, the server also may send an updated account balance to the client terminal for display to the patron (step 816). In another embodiment, the client terminal may just update the account balance based on the result and display it to the patron (step 816). Moreover, although not shown, the server 108 may flag the particular wager in the transaction history file to indicate that the wager has been revealed.

In another embodiment, in addition to selecting a reveal method, the patron may be given the option of selecting a denomination value for each wager (step 814). This denomination value may be equal to or less than the denomination value specified by the patron when the patron purchased the wagers. Several methods may be used to allow patrons to change the denomination value when revealing the results. For example, when determining the results of the wagers, server 108 may ignore the denomination value, if any, specified by the patron and instead use wagers that have a low value, for example, 5 cents. By using a low denomination value when determining the results of the wagers, the patron may be able to vary the denomination value when revealing the results. For example, while a patron might specify a denomination value of $1 when purchasing wagers, the server 108 may ignore this selection and instead determine the results of the wagers with a denomination value of $0.25. Then, during the reveal process, if the patron specifies a first denomination value of $1.50, the server may aggregate the result of the first six $0.25 cent wagers to determine the result of a $1.50 wager. Later, if the patron specifies a second denomination value of $0.50, the server may aggregate the result of the first two wagers to determine the result of a $0.50 wager. These and other methods will be apparent to one skilled in the art from the following and foregoing description and thus, are also within the scope of the present invention.

Next, the server 108 determines whether there are any additional unrevealed wagers (step 818), for example, by examining the transaction history file. If there are additional unrevealed wagers, the patron may be given the option of revealing these wagers (step 822). If the patron does want to reveal these unrevealed wagers, the reveal process is repeated.

On the other hand, if the server determines that there are no additional unrevealed wagers, the server 108 may send a message to the client terminal for display to the patron notifying the patron that there are no more unrevealed wagers (steps 818 and 820).

If the patron does want to stop revealing or if the server has determined that there are no additional unrevealed wagers, the server may display the selection menu again (steps 822, 818, 820, and 808). Then, the patron may select other options, such as logoff (step 824). The server completes the patron request and the process is complete (step 828).

In one embodiment, other options that may be available to the patron (step 824) include buying additional wagers. In another embodiment, in step 824, the patron may be able to locate other patrons and/or communicate with other patrons. In still another embodiment, in step 824, if a facility awards complimentary points to a patron for playing games, the patron may be able to check the total number of complimentary points that he or she has earned and/or use these complementary points to obtain items offered by the facility, for example. In addition to using complementary points to obtain items, the patron also may be able to purchase other items.

After completing the process in FIG. 8, if the patron has any unrevealed wagers, the patron may log onto a client terminal to reveal the results of these wagers and repeat the process shown in FIG. 8. In another embodiment, the patron may go back to the facility and continue to reveal results using on-site client terminal 102. In still another embodiment, the patron may go back to the facility and log onto the on-site client terminal 102, for example, to play traditional games. In this embodiment, the client terminal may send a logon message to server 108. Upon receiving the logon message, server 108 may erase the unrevealed wagers and add the money applied towards the unrevealed wagers, and the wager pool to the patron's account balance. Then, the patron may use this updated account balance to, for example, play traditional games. Alternatively, the patron may go to service client terminal 104 and request that the patron's unrevealed wagers be erased and request a refund of the money that was applied towards the unrevealed wagers, wager pool, and or any of his account balance. In the latter two embodiments, when erasing the unrevealed wagers, the server 108 may record the results of these unrevealed wagers in the patron account file and apply these results to wagers that the patron purchases in the future. Other such methods will be apparent to those skilled in the art from the foregoing and following description and thus, are within the scope of the present invention. For example, the patron may not choose to reveal results and may return to the facility and request a refund. Alternatively, the patron could come back to the facility and may want to use the money applied towards the unrevealed wagers to play traditional games.

The above-noted features, other aspects, and principles of the present invention may be implemented in various system or network configurations to provide automated and computational tools to provide a patron with the ability to play from an off-site location. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

It will be apparent to those skilled in the art that various modifications and variations can be made in the system and method of the present invention and in construction of this invention without departing from the scope or spirit of the invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A gaming method, comprising:

receiving, at a server, a purchase request for at least one wager from a patron at a first client terminal before a game play has begun;

determining, at the server, results of the at least one wager before the game play has begun;

storing, at the server, the results of the at least one wager in a database before the game play has begun;

adjusting, at the server, an account of the patron based on the results of the at least one wager before the game play has begun;

receiving, at the server, from a second client terminal during the game play, a request to reveal the results of the at least one wager; and sending, from the server, the results of the at least one wager to the second client terminal during the game play.

2. The method of claim 1, wherein receiving, at the server, a purchase request includes receiving a purchase amount.

3. The method of claim 1, wherein receiving, at the server, a purchase request includes receiving a purchase amount and a denomination value.

4. The method of claim 1, wherein receiving, at the server, a purchase request includes receiving a number of wagers and a denomination value.

5. The method of claim 1, wherein receiving, at the server, a purchase request includes receiving a purchase request from a client terminal located at a facility.

6. The method of claim 1, wherein sending, from the server, the results of the at least one wager to the second client terminal during the game play comprises sending the results of the at least one wager to the second client terminal during the game play in response to a request received via an online network connected to the server to reveal the results of the at least one wager during the game play.

7. The method of claim 1, wherein sending, from the server, the results of the at least one wager to the second client terminal during the game play includes sending the results of the at least one wager to the second client terminal during the game play via an online network.

8. A computer-readable medium containing instructions for causing a computer to perform a gaming method, the method comprising:

receiving, at a server, a patron identifier identifying a patron from a first client terminal before a game play has begun;

receiving, at the server from the first client terminal before the game play has begun, a purchase request for at least one wager;

debiting, at the server, an account balance of a patron account corresponding to the received patron identifier based on the received purchase request;

determining, at the server, a result of the at least one wager before the game play has begun;

storing, at the server, the result of the at least one wager in a database before the game play has begun;

adjusting, at the server, the account balance of the patron account based on the result of the at least one wager before the game play has begun;

receiving, at the server, a request to reveal the result of the at least one wager from a second client terminal during the game play; and sending, from the server, the results of the at least one wager to the second client terminal during the game play.

9. A computer readable medium containing instructions for causing a computer to perform a gaming method, the method comprising:

receiving, at a server, a patron identifier identifying a patron from a client terminal before a game play has begun;

receiving, at the server, a purchase request for a plurality of wagers from the client terminal before the game play has begun;

debiting, at the server, an account balance of a patron account corresponding to the received patron identifier based on the received purchase request;

determining, at the server, results of the plurality of wagers before the game play has begun;

adjusting, at the server, the account balance of the patron account based on the results of the plurality of wagers before the game play has begun;

storing, at the server, the results of the plurality of wagers in a database before the game play has begun;

receiving, at the server, a request to reveal the results of the plurality of wagers during the game play; and sending, from the server, the results of the plurality of wagers to the client terminal during the game play.

10. A server connected to a plurality of client terminals in a gaming system, comprising:

a communications component for receiving, from a patron at a first client terminal, a purchase request for at least one wager before a game play has begun;

a wagering component for determining results of the at least one wager before the game play has begun;

an adjusting component for adjusting an account balance of the patron according to the results of the at least one wager before the game play has begun;

a database for storing the results of the at least one wager before the game play has begun;

a reveal component for receiving a request from a second client terminal to reveal the results of the at least one wager during the game play; and a sending component for sending the results of the at least one wager to the second client terminal during the game play.

11. The server of claim 10, wherein the communications component further comprises a database interface for retrieving the results of the at least one wager from the database.

12. A server connected to a plurality of client terminals in a gaming system, comprising:

means for receiving, from a patron at a client terminal, a purchase request for a plurality of wagers before a game play has begun;

means for determining results of each of the plurality of wagers before the game play has begun;

means for adjusting an account balance of the patron according to the results of each of the plurality of wagers before the game play has begun;

means for storing each of the results of the plurality of wagers before the game play has begun;

means for receiving a request to reveal the results of the plurality of wagers during the game play; and means for sending the results of the plurality of wagers to the client terminal during the game play.

13. A gaming method, comprising:

receiving, at a server, a purchase request for at least one wager from a first client terminal before a game play has begun;

determining, at the server, results of the at least one wager before the game play has begun and after receiving the purchase request;

updating a player account based on the results of the at least one wager before the game play has begun;

storing, at the server, the results of the at least one wager in a database before the game play has begun;

receiving, at the server, from a second client terminal, a request for the results of the at least one wager during the game play; and sending, from the server, the results of the at least one wager to the second client terminal during the game play.

14. A gaming method, comprising:

receiving, at a server, a purchase request for at least one wager from a first client terminal before a game play has begun, wherein the purchase request includes a purchase amount and a denomination value;

dividing the purchase amount by the denomination value to determine a number of wagers;

after the purchase request is received, determining, at the server, results of the number of wagers before the game play has begun;

calculating a wager pool based on the results;

while the wager pool is greater than zero, determining results of additional wagers, and updating the results of the wagers based on the results of the additional wagers; and updating a player account based on the results before game play has begun.

* * * * *